United States Patent
Choi et al.

(10) Patent No.: US 6,919,817 B2
(45) Date of Patent: Jul. 19, 2005

(54) REMOTE CONTROLLER WITH SELECTION BUTTON AND ACCOMMODATING PORTIONS

(75) Inventors: Seung-eok Choi, Seoul (KR); Han-soo Kim, Seoul (KR); Young-kyu Jin, Goyang-si (KR); Hyu-ju Kim, Incheon Metropolitan (KR); Hee-seon Park, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 112 days.

(21) Appl. No.: 10/253,584

(22) Filed: Sep. 25, 2002

(65) Prior Publication Data

US 2003/0095048 A1 May 22, 2003

(30) Foreign Application Priority Data

Nov. 19, 2001 (KR) ........................................ 2001-71819

(51) Int. Cl.[7] ..................... G08C 19/00; H03K 17/94; H03M 11/00
(52) U.S. Cl. ..................... 340/825.69; 341/22; 341/34
(58) Field of Search ................ 340/825.69; 341/22, 341/23, 31, 176; 200/5 A, 46

(56) References Cited

U.S. PATENT DOCUMENTS

| 4,106,216 A | * | 8/1978 | Boehm | 434/345 |
| D367,061 S | * | 2/1996 | Davison | D14/218 |
| 5,579,002 A | * | 11/1996 | Iggulden et al. | 341/23 |
| 6,163,282 A | * | 12/2000 | Mitsuzuka et al. | 341/22 |
| 6,650,254 B1 | * | 11/2003 | Rix | 341/22 |

FOREIGN PATENT DOCUMENTS

| JP | 2-57093 A | 2/1990 |
| JP | 8-294188 A | 11/1996 |
| JP | 9-258877 | 10/1997 |
| KR | 6-58679 | 8/1994 |
| WO | WO 94/28634 | 12/1994 |

* cited by examiner

Primary Examiner—Brian Zimmerman
Assistant Examiner—Clara Yang
(74) Attorney, Agent, or Firm—Sughrue Mion, PLLC (57) ABSTRACT

A remote controller includes a main body where a plurality of accommodation portions are provided, at least one selection button accommodated in one of the accommodation portions to be capable of being replaceable, an ID determination portion which determines an ID assigned to the selection button, and a signal generating portion which generates a remote control signal corresponding to the ID determined by the ID determination portion according to operation of the selection button. Thus, since a user can freely arrange buttons at desired positions, a remote controller can be configured suitable for the taste of the user. Also, the remote controller is flexible to addition or removal of functions of electronic apparatuses to be controlled.

11 Claims, 10 Drawing Sheets

REMOTE CONTROLLER WITH SELECTION BUTTON AND ACCOMMODATING PORTIONS

BACKGROUND OF THE INVENTION

1. Field of the Invention

The present invention relates to a remote controller that is a remote controlling apparatus of an electronic apparatus, and more particularly, to a remote controller in which a user can freely arrange buttons. The present application is based on Korean Patent Application 2001-0071819, which is incorporated by reference in full herein.

2. Description of the Related Art

In general, remote controllers control electronic apparatuses and devices from a remote position to perform predetermined functions. For this purpose, a remote controller generates a control signal according to the operation of a user which makes an electronic apparatus perform a desired function. While an electronic apparatus typically has a dedicated remote controller, there are integrated remote controllers that can control a variety of electronic apparatuses.

However, an integrated remote controller needs a number of buttons to correspond to various functions of electronic apparatuses. Accordingly, since the size of a button decreases, when a user tries to operate a single button, key or knob, interference is generated between buttons, keys or knobs. Also, intuitive perception of the button deteriorates.

To overcome the above problem, a hidden button type remote controller has been developed in which the number of buttons exposed to the outside is reduced and buttons that correspond to special functions or are not frequently used are hidden.

Figure 1:
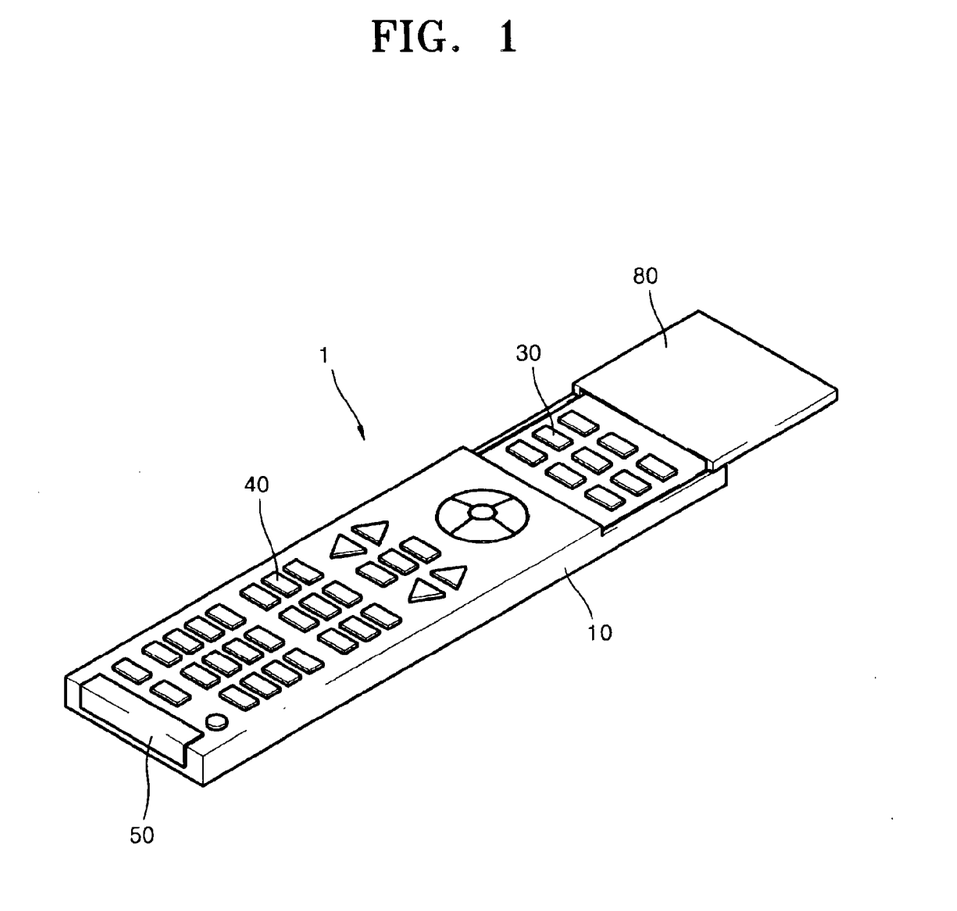
FIG. 1 is a perspective view showing a conventional hidden button type remote controller.

FIG. 1 shows a conventional hidden button type remote controller. Referring to the drawing, a remote controller 1 includes a main body 10, open buttons 40 installed at the main body 10 and always exposed to the outside, a cover 80 installed to be capable of sliding with respect to the main body 10, hidden buttons 30 selectively exposed or hidden as a user slides the cover 80, and an IR (infrared) transmitting portion 50 for generating an infrared signal corresponding to the operation of the open buttons 40 or the hidden buttons 30.

Here, when the operation of a function corresponding to the hidden buttons 30 is needed, a user slides the cover 80 to expose to the outside the hidden buttons 30, and one of the hidden buttons 30 exposed to the outside is operated. On the other hand, when the operation of a function corresponding to one of the hidden buttons 30 is not needed, the cover 80 is slid to the original position to hide the hidden buttons 30. Thus, the problem generated due to a number of buttons can be partially solved.

However, since the arrangement and function of the buttons of the conventional remote controller is previously set by a manufacturer, it is practically difficult to obtain a remote controller having a button arrangement that a user desires.

Recently, a touch screen type remote controller has been introduced in which buttons corresponding to the functions of electronic apparatuses are displayed on an LCD screen and a control signal corresponding to a button is generated by touching the display button portion. In the touch screen type remote controller, the arrangement of buttons displayed on the LCD screen can be programmed so that the buttons are arranged so as to be easily used by a user.

However, in this type remote controller, types of buttons that can be arbitrarily arranged by a user are limited by a manufacturer and programming of the button arrangement by a user is very inconvenient. Therefore, a remote controller having an improved structure by which a user can easily select and arrange buttons is required.

SUMMARY OF THE INVENTION

To solve the above-described problems, it is an object of the present invention to provide a remote controller in which buttons can be freely arranged by a user.

To achieve the above object, there is provided a remote controller comprising a main body where a plurality of accommodation portions are provided, at least one selection button accommodated in one of the accommodation portions to be capable of being replaceable, an ID determination portion which determines an ID assigned to the selection button, and a signal generating portion which generates a remote control signal corresponding to the ID determined by the ID determination portion according to operation of the selection button.

It is preferred in the present invention that the ID determination portion comprises a plurality of identification holes formed in a lower portion of the selection button corresponding to assigned ID and an ID generating portion which generates an ID signal corresponding to the identification holes.

It is preferred in the present invention that the ID generating portion includes a plurality of identification pins which are provided in the accommodation portions, elastically biased in a direction opposite to a direction in which the selection button is accommodated, and installed to be capable of sliding in the direction in which the selection button is accommodated.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

A remote controller according to a preferred embodiment of the present invention is described with reference to FIGS. 1 through 12. The buttons are capable of selectively being exposed to the outside or hidden by a user are shown here as selection buttons to be freely arranged. All of the buttons can be configured as selection buttons of a remote controller, whether they are exposed or hidden.

Figure 2:
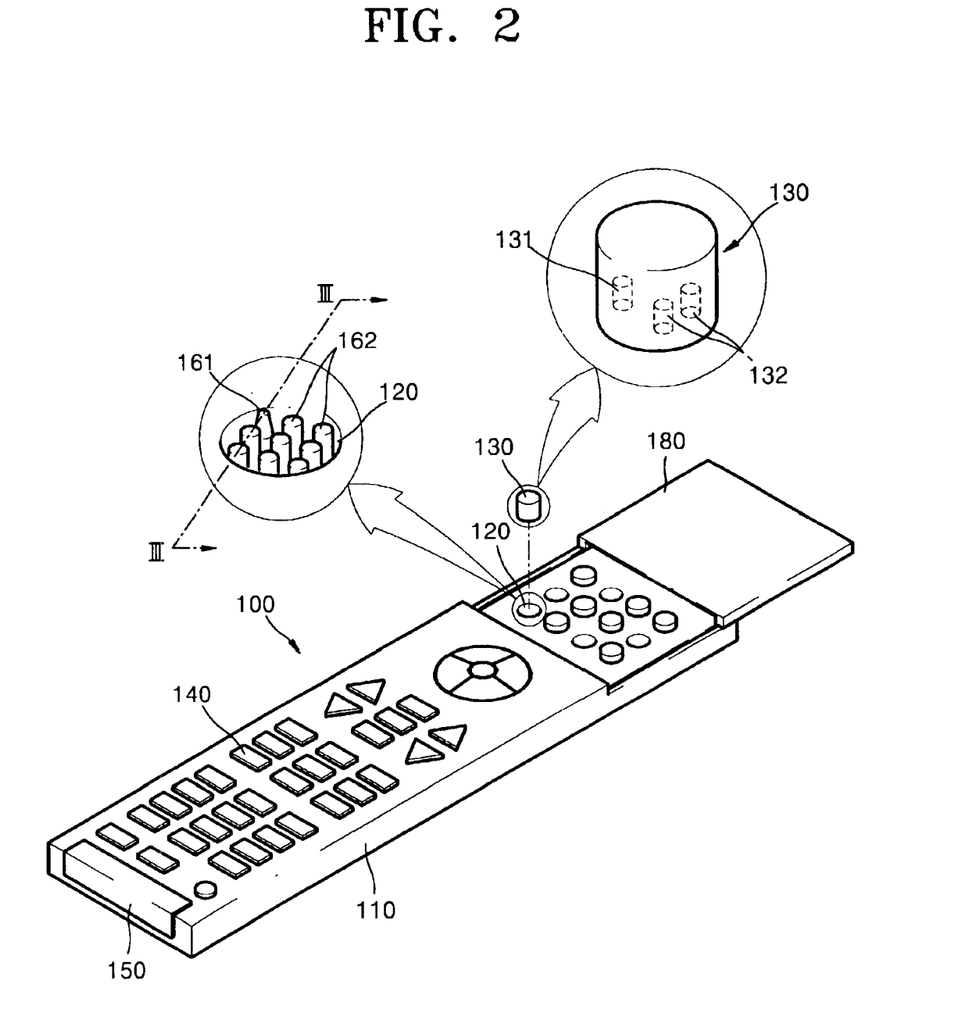
FIG. 2 is a perspective view showing a remote controller according to a preferred embodiment of the present invention.

Referring to FIG. 2, a remote controller 100 according to a preferred embodiment of the present invention includes a main body 110 in which a plurality of accommodation portions 120 are formed, a selection button 130 which is accommodated in the accommodation portion 120 to be capable of being exchanged, and an IR transmitting portion 150 for generating an infrared ray signal in response to the operation of the selection button 130. Here, reference numeral 140 denotes an open button and reference numeral 180 denotes a cover.

A reference hole 131 and identification holes 132 for assigning an ID of the selection button 130 are formed in the lower portion of the selection button 130. Also, a reference pin 161 is provided corresponding to the reference hole 131 to guide accommodation of the selection button 130 and a plurality of identification pins 162 installed to be capable of sliding in a direction in which the selection button 130 is accommodated are provided in the accommodation portion 120.

Figure 3:
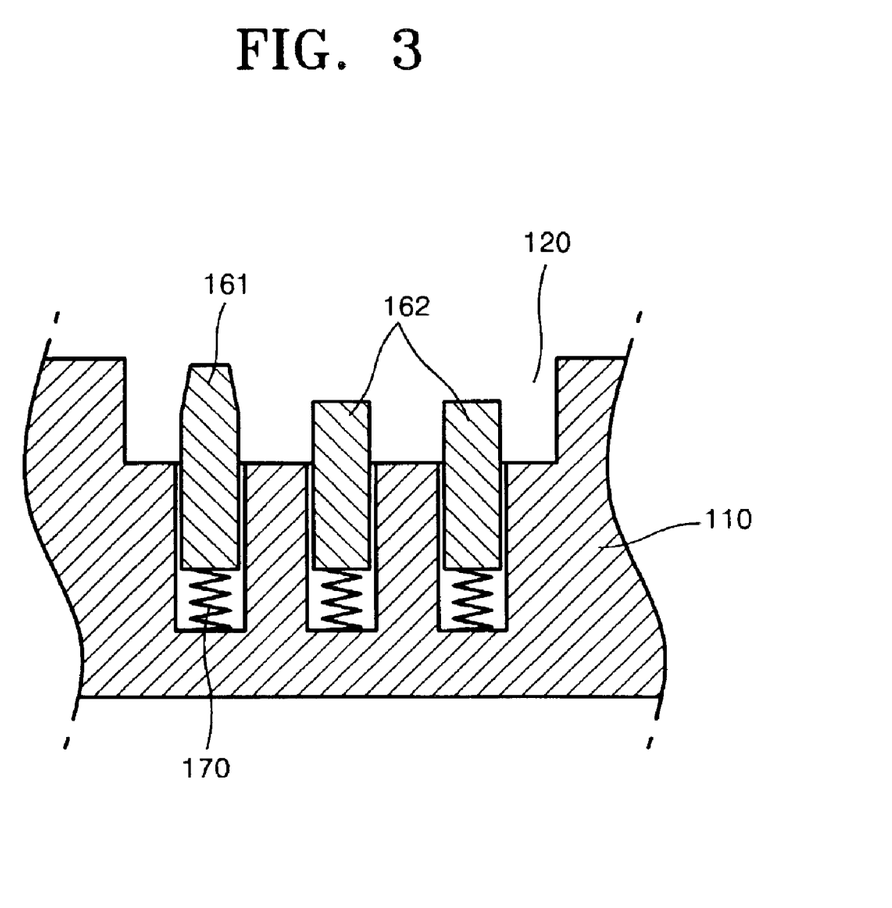
FIG. 3 is a sectional view taken along line III—III of FIG. 2, showing a vertical structure of a reference pin and identification pins.

Also, as shown in FIG. 3, the reference pin 161 and the identification pins 162 are elastically biased by an elastic member 170 installed at the lower portion of each pin in the direction opposite to a direction in which the selection button 130 is accommodated. Here, the reference pin 161 having a tapered shape guides a stable installation of the selection button 130 when the selection button 130 is accommodated in the accommodation portion 120.

Figure 4:
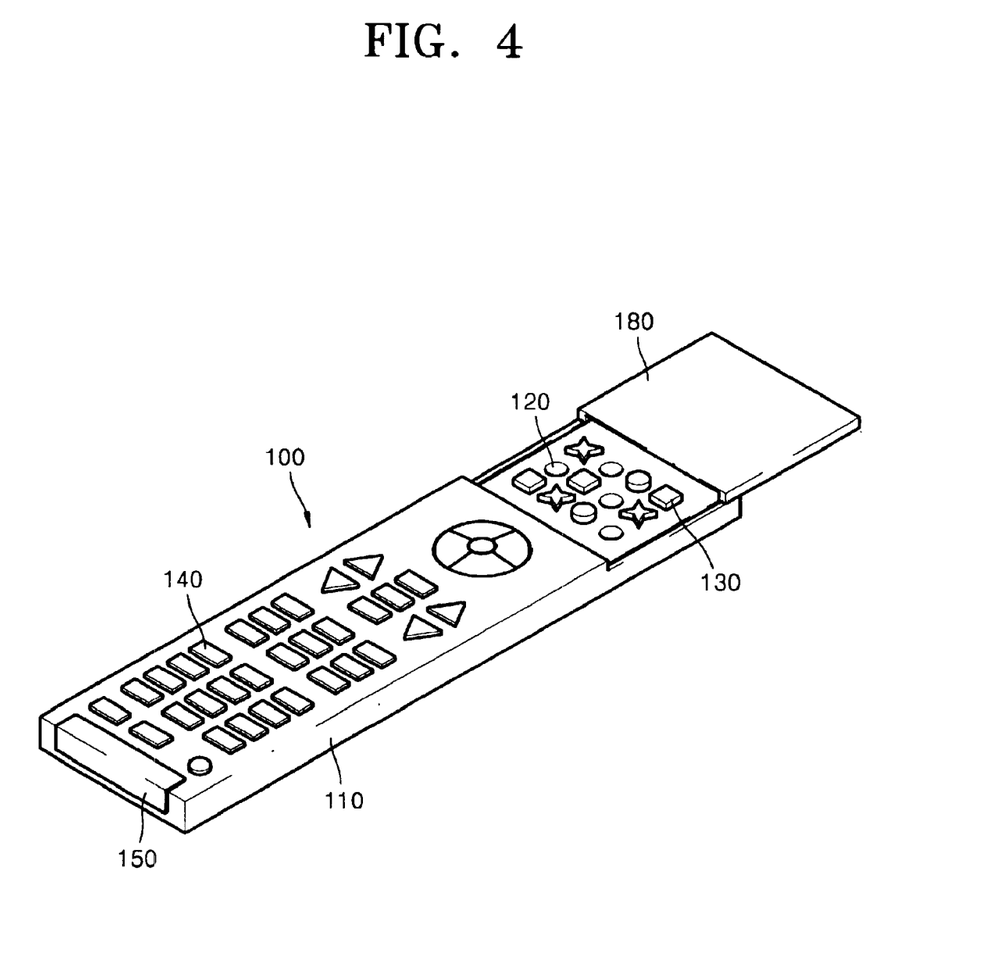
FIG. 4 is a perspective view showing one of various examples of the shape and pattern of the selection button.

As shown in FIG. 4, the selection button 130 can have a variety of shapes and patterns. Accordingly, a user can select the selection button having a desired shape or pattern so that intuition of the selection button 130 by the user can be improved.

The operation of the remote controller according to a preferred embodiment of the present invention is described below with reference to FIGS. 5 through 12.

Figure 5:
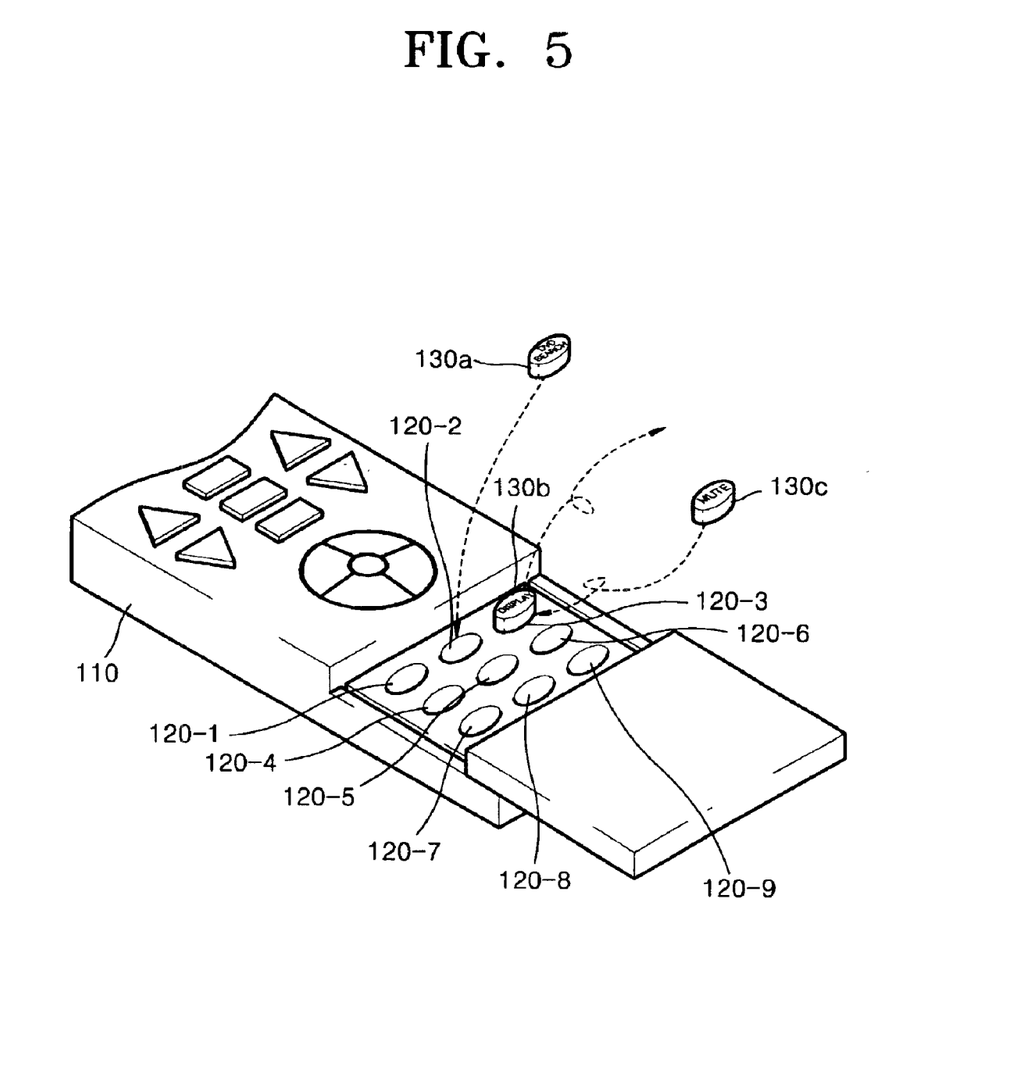
FIG. 5 is a perspective view for explaining the operation of the remote controller shown in FIG. 2.

For the convenience of explanation, as shown in FIG. 5, a selection button 130a for a DVD SEARCH function is additionally accommodated in an accommodation portion 120-2 of a plurality of accommodation portions 120-1, 120-2, 120-3, 120-3, 120-4, 120-5, 120-6, 120-7, 120-8, and 120-9, that the user selects, and a selection button 130b for a DISPLAY function accommodated in the accommodation portion 120-3 is replaced by a selection button 130c for a MUTE function.

First, the case of adding the selection button 130a for a DVD SEARCH function in the accommodation portion 120-2 is described below.

Figure 6:
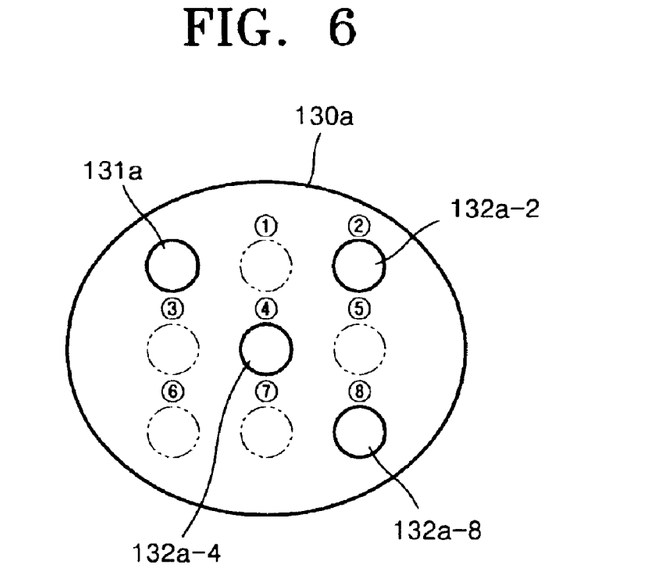
FIG. 6 is a bottom view of a selection button corresponding to a DVD SEARCH function.

Referring to FIG. 6, a reference hole 131a and three identification holes 132a-2, 132a-4, and 132a-8 corresponding to ID numbers (2), (4), and (8) are formed in the lower portion of the selection button 130a for a DVD SEARCH function. Here, the ID numbers are numbered in order from 1 to 8.

Figure 7:
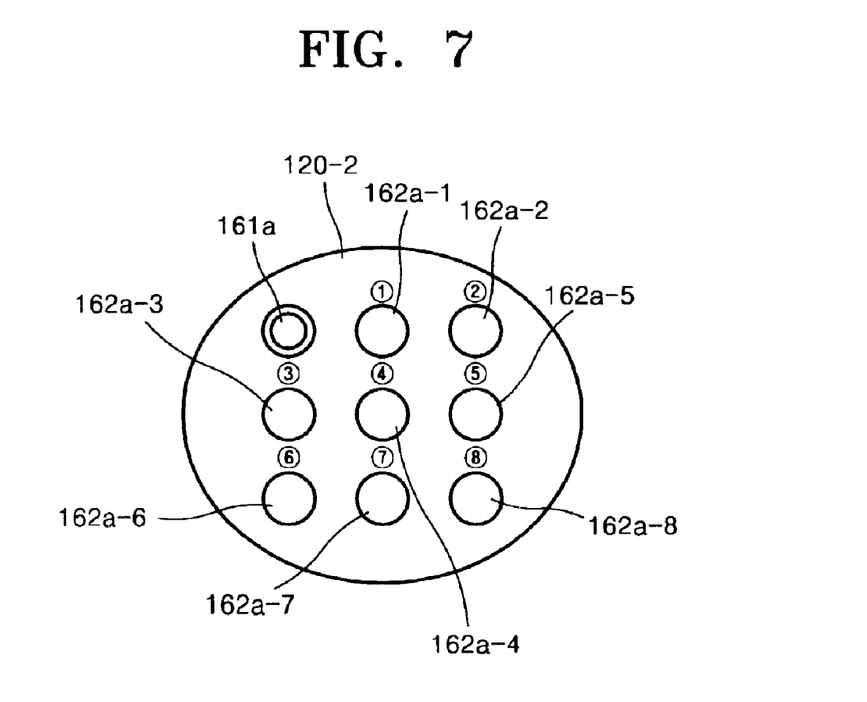
FIG. 7 is a plan view showing an accommodation portion where the selection button corresponding to a DVD SEARCH function is accommodated.

As shown in FIG. 7, a reference pin 161a and eight ID pins 162a-1, 162a-2, 162a-3, 162a-4, 162a-5, 162a-6, 162a-7, and 162a-8 corresponding to ID numbers (1), (2), (3), (4), (5), (6), (7), and (8) are installed at the accommodation portion 120-2 where the selection button 130a for a DVD SEARCH function is accommodated. Here, the ID numbers are numbers in order from (1) to (8).

Figure 8:
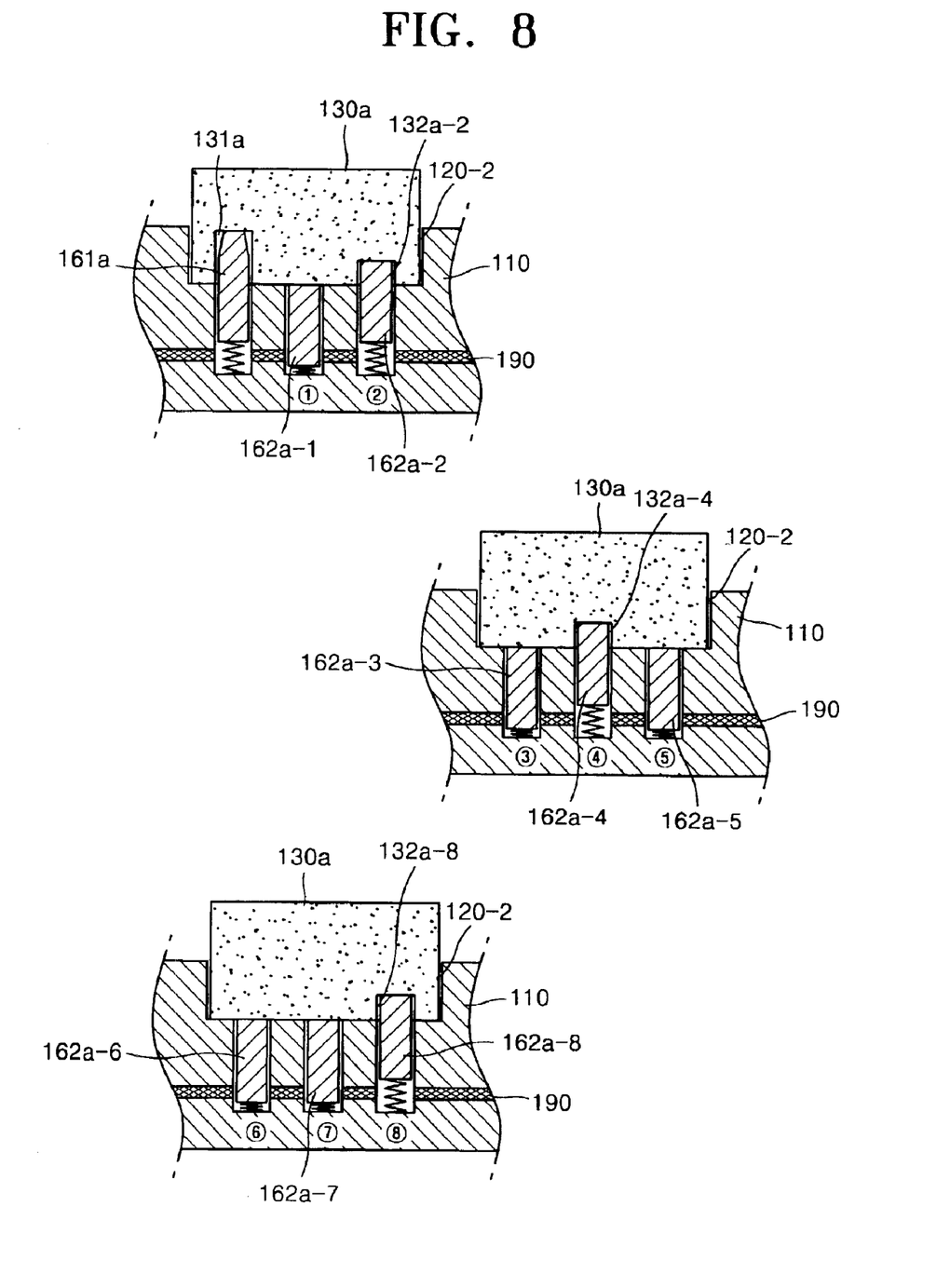
FIG. 8 is a sectional view showing a state in which the selection button shown in FIG. 6 is accommodated in the accommodation portion of FIG. 7.

FIG. 8 shows a state in which the selection button 130a for a DVD SEARCH function is accommodated in the accommodation portion 120-2 selected by a user.

Referring to the drawing, when the selection button 130a for a DVD SEARCH function is accommodated in the selected accommodation portion 120-2, the reference pin 161a is inserted into the reference hole 131a formed corresponding to the reference pin 161a while guiding the accommodation of the selection button 130a. The identification pins 162a-2, 162a-4, and 162a-8 corresponding to ID numbers (2), (4), and (8) are inserted into the identification holes 132a-2, 132a-4, and 132a-8 corresponding to the ID numbers (2), (4), and (8) formed corresponding to the identification pins 162a-2, 162a-4, and 162a-8. The identification pins 162a-1, 162a-3, 162a-5, 162a-6, and 162a-7 corresponding to ID numbers (1), (3), (5), (6), and (7) are pressed by the lower surface of the selection button 130a and slide downward.

The identification pins 162a-1, 162a-3, 162a-5, 162a-6, and 162a-7 corresponding to ID numbers (1), (3), (5), (6), and (7) which slide downward by being pressed by the lower surface of the selection button 130a contact an ID transmitting circuit 190 installed at the main body 110. Then, the ID transmitting circuit 190 detects contact points with the identification pins 162a-1, 162a-3, 162a-5, 162a-6, and 162a-7 and generates an ID signal corresponding to the selection button 130a for a DVD SEARCH function.

Figure 9:
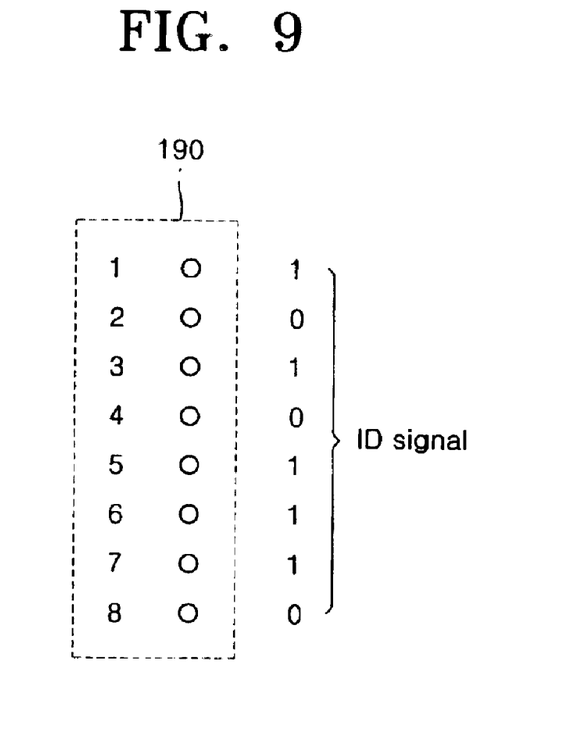
FIG. 9 is a view for explaining an ID signal generated by an ID transmitting circuit.

FIG. 9 is a view for explaining the ID signal generated by the ID transmitting circuit 190. As shown in the drawing, when the identification pins 162a-1, 162a-3, 162a-5, 162a-6, and 162a-7 pressed downward contact the ID transmitting circuit 190, the ID transmitting circuit 190 detects contact points and sets "1". When the identification pins 162a-2, 162a-4, and 162a-8 which are not pressed downward are inserted into the identification holes 132a-2, 132a-4, and 132a-8, the ID transmitting circuit 190 sets "0", so that ID can be expressed as binary digits. The reference pin 161a does not generate a corresponding ID. Thus, the ID signal of the selection button 130a corresponding to the DVD SEARCH function can be expressed as binary digits of "10101110".

In the above preferred embodiment, a reference hole is formed, the maximum eight identification holes can be formed, and a reference pin and eight identification pins are installed. The maximum number of the identification holes and pins can be changed. However, in the case in which the maximum eight identification holes and the maximum eight identification pins are present, the maximum number of IDs to be represented is 256 ($=2^8$).

When an ID signal corresponding to "10101110" is generated from the ID transmitting circuit 190, a predetermined ID determination circuit (not shown) detects the ID signal generated by the ID transmitting circuit 190 and recognizes that a selection button having an ID corresponding to a DVD SEARCH function is accommodated. Also, the ID determination circuit provides arrangement information that the selection button for a DVD SEARCH function is accommodated in the accommodation portion 120-2 shown in FIG. 5 to a central processing unit (CPU) (not shown) via a predetermined interface (not shown). CPU sets forth a map regarding the arrangement of the selection button corresponding to a DVD SEARCH function according to the arrangement information received by the ID determination circuit and stores the map in a predetermined storage device (not shown).

When a user operates the added selection button for a DVD SEARCH function, an intrinsic signal corresponding to the accommodation portion 120-2 where the selection button for a DVD SEARCH function is accommodated is generated from the accommodation portion 120-2. The signal is transmitted to a predetermined operation determination circuit (not shown). The operation determination circuit determines that the operated selection button is accommodated in the accommodation portion 120-2 shown in FIG. 5 and the information is transmitted to CPU by using a predetermined interface (not shown).

Then, since the CPU memorizes the arrangement map of the operated selection button for a DVD SEARCH function and recognizes the operated selection button as the selection button accommodated in the accommodation portion 120-2 shown in FIG. 5, it makes the IR transmitting portion 150 (refer to FIG. 2) transmit an infrared ray signal corresponding to the DVD SEARCH function. It will be understood that while the preferred embodiment of the remote controller according to the invention is described as transmitting an IR signal, other types of signals, including radio waves and frequencies of other portions of the electromagnetic spectrum, sound waves, wired electronic signals and any type of signal suitable for carrying out the functions of the invention are also included. Similarly, a remote control physically or logically coupled to another device, such an information processor, is also intended.

Meanwhile, when a selection button is added or replaced, to initiate an ID check of a newly accommodated selection button, a method of physically generating a signal indicating that a selection, button is accommodated in the accommodation portion can be used. For example, in FIG. 5, when the reference pin 161a is inserted into the identification hole 131a-1, a predetermined signal is generated so that the ID check of the newly accommodated selection button 130a is performed.

It will be understood that while certain controlled devices and particular controlled functions have been explicitly disclosed, all devices that may be controlled, and all functions on the controlled devices that may be controlled by a remote controller according to the present invention are included.

Next, a case of replacing the selection button 130b for a DIPLAY function already accommodated in the accommodation portion 120-3 with the selection button 130c for a MUTE function is described with reference to FIG. 5.

Referring to the drawing, a user removes the selection button 130b for a DIPLAY function accommodated in the accommodation portion 120-3 from the accommodation portion 120-3. Then, the user accommodates the selection button 130c for a MUTE function in the accommodated portion 120-3.

Figure 10:
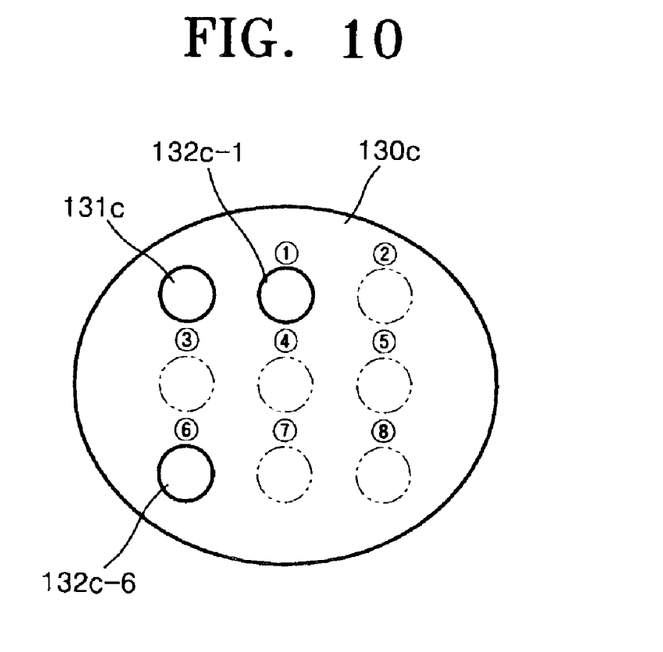
FIG. 10 is a bottom view of a selection button corresponding to a MUTE function.
Figure 11:
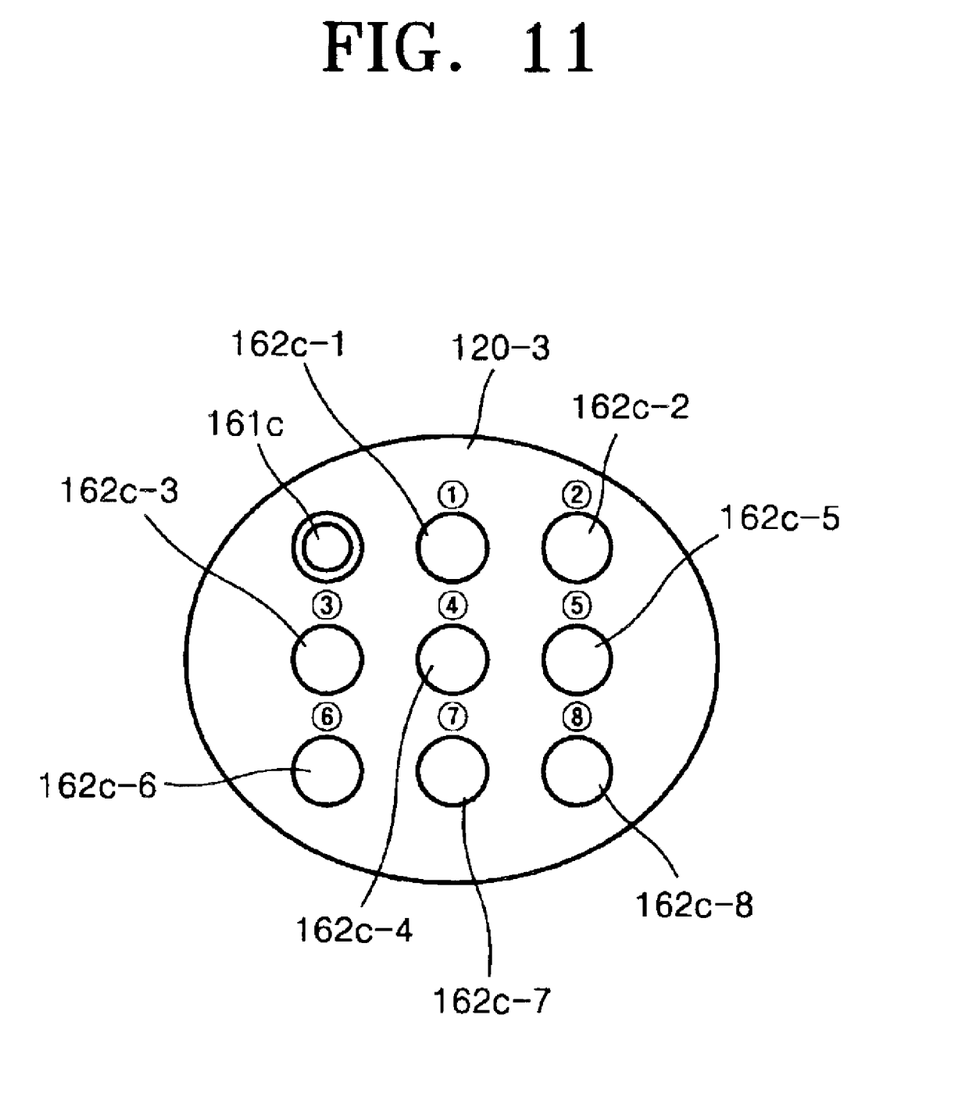
FIG. 11 is a view showing an accommodation portion where the selection button corresponding to a MUTE function is accommodated.

Also, as shown in FIG. 10, two identification holes 132c-1 and 132c-6 corresponding to ID numbers (1) and (6) are formed in the lower portion of the selection button 130c for a MUTE function. Referring to FIG. 11, like the above-described accommodation portion 120-2 accommodating the selection button 130a for a DVD SEARCH function, one reference pin 161c and eight identification pins 162c-1, 162c-2, 162c-3, 162c-4, 162c-5, 162c-6, 162c-7, and 162c-8 are installed in the accommodation portion 120-3 where the selection button 130c is accommodated.

Figure 12:
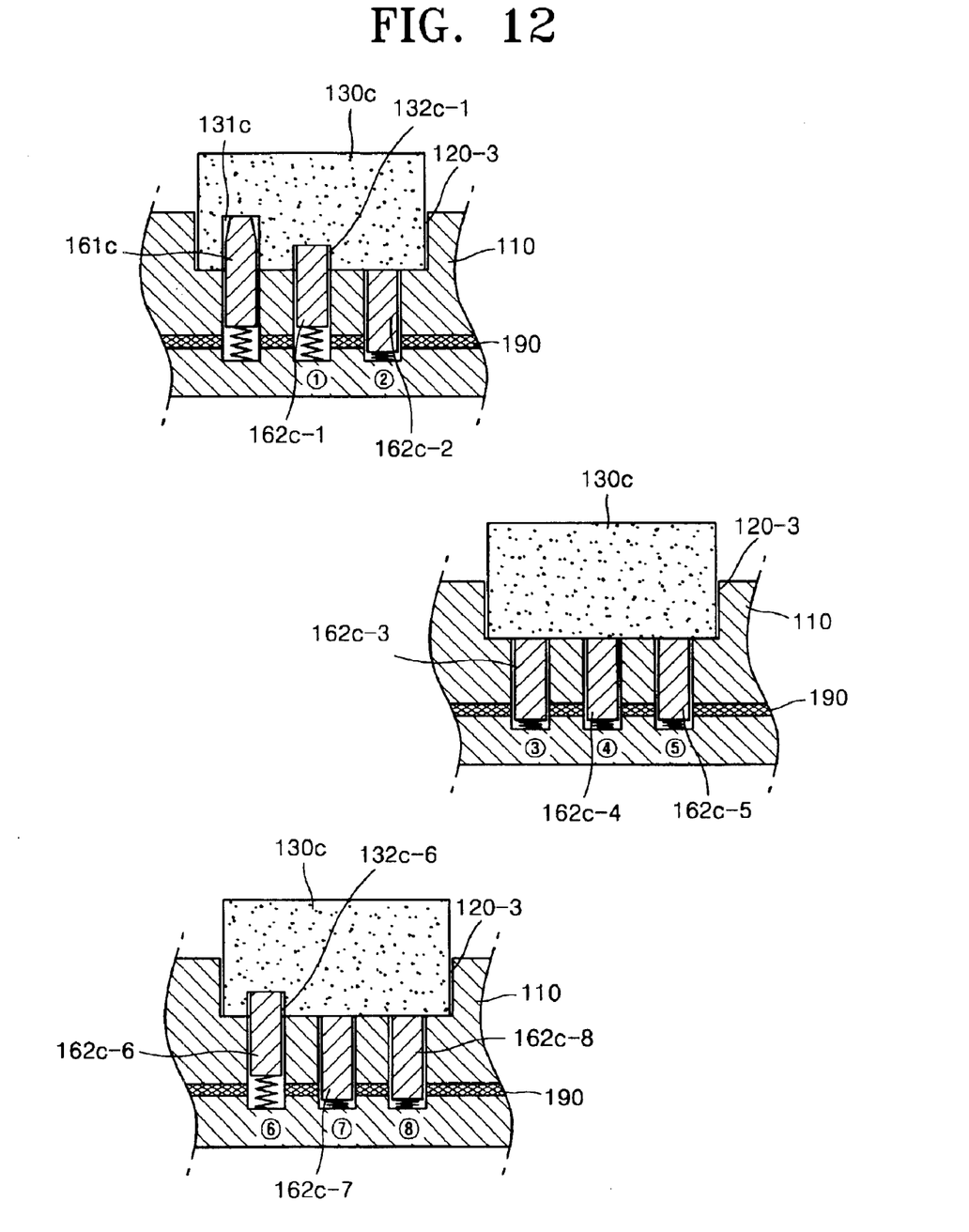
FIG. 12 is a sectional view showing a state in which the selection button shown in FIG. 10 is accommodated in the accommodation portion of FIG. 11.

Then, as shown in FIG. 12, the identification pins 162c-1 and 162c-6 corresponding to ID numbers (1) and (6) of the identification pins 162c-1, 162c-2, 162c-3, 162c-4, 162c-5, 162c-6, 162c-7, and 162c-8 installed at the accommodation portion 120-3 are inserted into the identification holes 132c-1 and 132c-6 corresponding to ID numbers (1) and (6) formed to correspond to the identification pins 162c-1 and 162c-6, respectively. Here, while inserted into the reference hole 131c, the reference pin 161c guides the selection button 130c to be stably accommodated. The identification pins 162c-2, 162c-3, 162c-4, 162c-5, 162c-7, and 162c-8 corresponding to ID numbers (2), (3), (4), (5), (7), and (8) slide downward by being pressed by the lower surface of the selection button 130c. Then, the ID transmitting circuit 190 (refer to FIG. 5) generates an ID signal corresponding to the selection button 130c for a MUTE function. Here, the ID signal is expressed as binary digits of "01111011".

Like the above-described case of additionally accommodating the selection button for a DVD SEARCH function, the arrangement map of a selection button for a MUTE function is set forth by CPU and stored in the storage device. Also, when a user operates the replaced selection button for a MUTE function, CPU makes the IR transmitting portion 150 (refer to FIG. 2) to transmit an infrared ray signal corresponding to a MUTE function as in the case of operating the selection button for a DVD SEARCH function.

As described above, in the remote controller according to the present invention, since a user can freely arrange buttons at desired positions, a remote controller can be configured suitable for the taste of the user. Also, the remote controller is flexible for the addition or removal of functions of electronic apparatuses to be controlled.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A remote controller comprising:
   a main body where a plurality of accommodation portions are provided;
   a selection button accommodated in one of the accommodation portions, said selection button configured to be replaceable;
   an ID determination portion, configured to determine an ID assigned to said selection button; and
   a signal generating portion configured to generate a remote control signal corresponding to the ID determined by the ID determination portion according to operation of the selection button,
   wherein the ID determination portion comprises a plurality of identification holes formed in a lower portion of the selection button corresponding to said assigned ID; and
   an ID generating portion which generates an ID signal corresponding to the identification holes,
   wherein the ID generating portion includes a plurality of identification pins which are provided in the accommodation portions, elastically biased in a direction opposite to a direction in which the selection button is accommodated, and installed to be capable of sliding in the direction in which the selection button is accommodated;

wherein each of said plurality of accommodating portions are capable of accommodating said at least one selection button.

2. The remote controller as claimed in claim 1, wherein the selection button is a hidden button.

3. The remote controller as claimed in claim 1, wherein said plurality of identification pins are elastically biased by elastic members installed at lower portions of said plurality of identification pins.

4. The remote controller as claimed in claim 1, further comprising at least one additional selection button assigned a different ID, wherein each of said plurality of accommodating portions is also capable of accommodating said at least one additional selection button.

5. The remote controller as claimed in claim 1, wherein said ID determination portion generates an ID signal based on contact points between said identification pins and an ID transmitting circuit.

6. A remote controller comprising:

a main body where a plurality of accommodation portions are provided;

a selection button accommodated in one of the accommodation portions, said selection button configured to be replaceable;

an ID determination portion, configured to determine an ID assigned to said selection button; and a signal generating portion configured to generate a remote control signal corresponding to the ID determined by the ID determination portion according to operation of the selection button, wherein the ID determination portion comprises a plurality of identification holes formed in a lower portion of the selection button corresponding to said assigned ID; and an ID generating portion which generates an ID signal corresponding to the identification holes, wherein the ID generating portion includes a plurality of identification pins which are provided in the accommodation portions, elastically biased in a direction opposite to a direction in which the selection button is accommodated, and installed to be capable of sliding in the direction in which the selection button is accommodated, wherein at least one of the identification pins is a reference pin that is standard to all the selection buttons of the accommodation portion, said reference pin configured to indicate addition or replacement of the selection button.

7. The remote controller as claimed in claim 6, wherein each of said plurality of accommodating portions are capable of accommodating said at least one selection button.

8. The remote controller as claimed in claim 7, further comprising at least one additional selection button assigned a different ID, wherein each of said plurality of accommodating portions is also capable of accommodating said at least one additional selection button.

9. The remote controller as claimed in claim 6, wherein the selection button is a hidden button.

10. The remote controller as claimed in claim 6, wherein said plurality of identification pins are elastically biased by elastic members installed at lower portions of said plurality of identification pins.

11. The remote controller as claimed in claim 6, wherein said ID determination portion generates an ID signal based on contact points between said identification pins and an ID transmitting circuit.

* * * * *